United States Patent [19]

King

[11] 4,383,791
[45] May 17, 1983

[54] LIFT MECHANISM FOR PICKUP TRUCKS

[75] Inventor: Louis J. King, Arvada, Colo.

[73] Assignee: Denver Spring Service & Mfg. Co., Inc., Denver, Colo.

[21] Appl. No.: 213,610

[22] Filed: Dec. 5, 1980

[51] Int. Cl.³ .............................................. B60P 1/48
[52] U.S. Cl. .................................... 414/542; 414/546; 414/680
[58] Field of Search ........................ 414/542, 546, 680

[56] References Cited

U.S. PATENT DOCUMENTS

| | | | |
|---|---|---|---|
| 2,758,730 | 8/1956 | Tapp | 414/546 |
| 3,095,099 | 6/1963 | Costello | 414/542 |
| 4,058,229 | 11/1977 | Triplett | 414/546 |

Primary Examiner—Richard A. Schacher
Attorney, Agent, or Firm—Gary M. Polumbus

[57] ABSTRACT

An inverted U-shaped boom is pivotally mounted adjacent the trailing end of a pickup truck bed so as to be movable between a rest position lying entirely within the confines of the truck bed and an operative position inclining upwardly and rearwardly so as to partially overhang the trailing end of the truck bed. A pair of hydraulic cylinders interconnect the boom with stanchions on which the boom is pivotally mounted and are operative to move the boom between the rest and operative positions. A winch is disposed along an upper portion of the boom and includes means for attachment to an article which is to be moved into or out of the truck bed.

1 Claim, 5 Drawing Figures

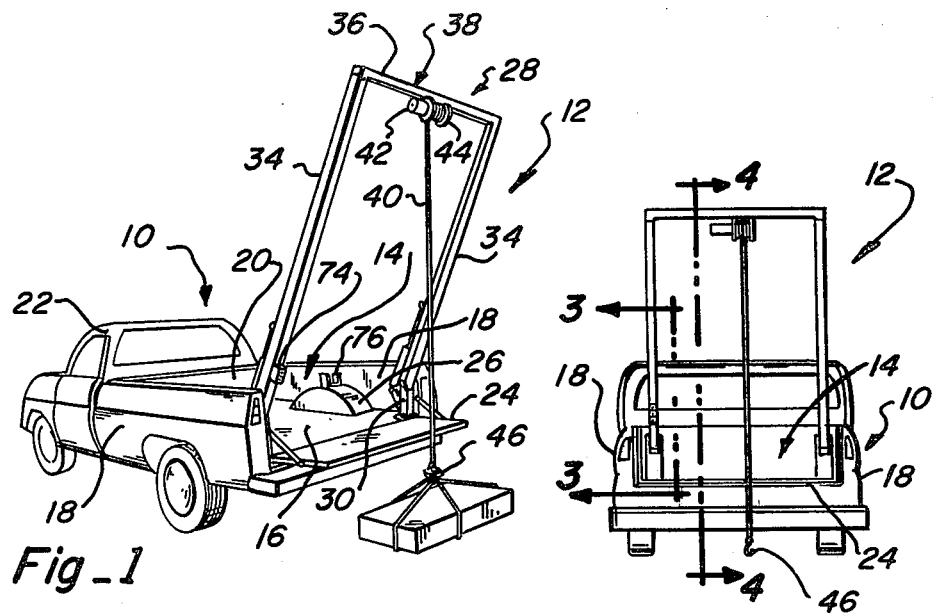
Fig_1
Fig_2
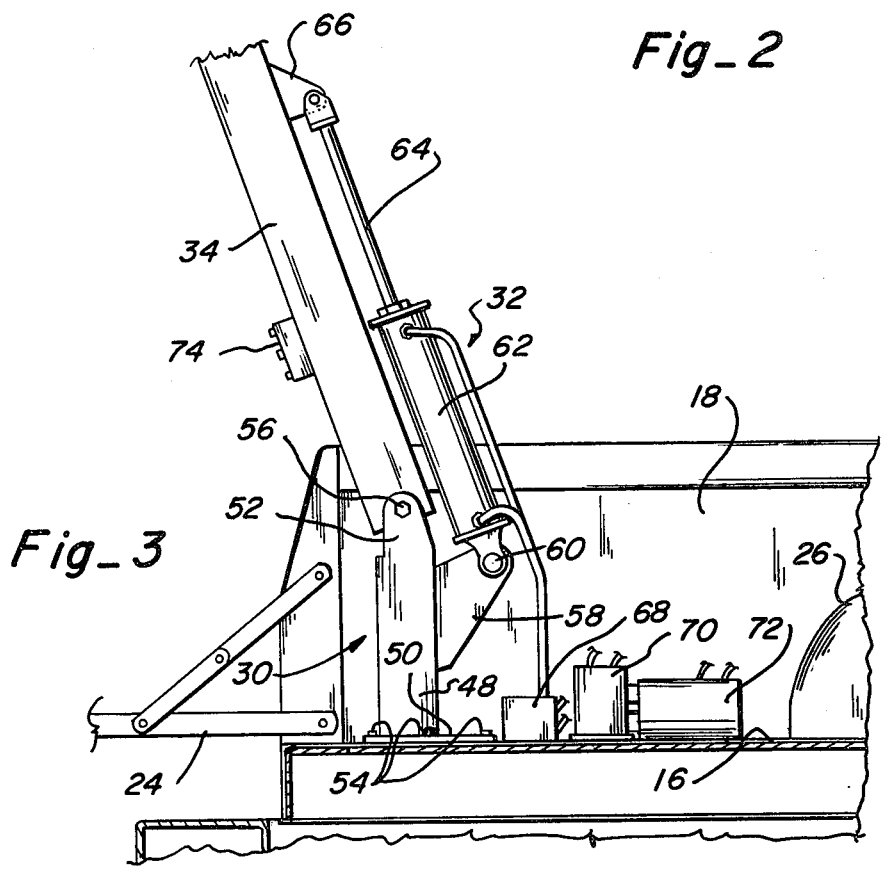
Fig_3

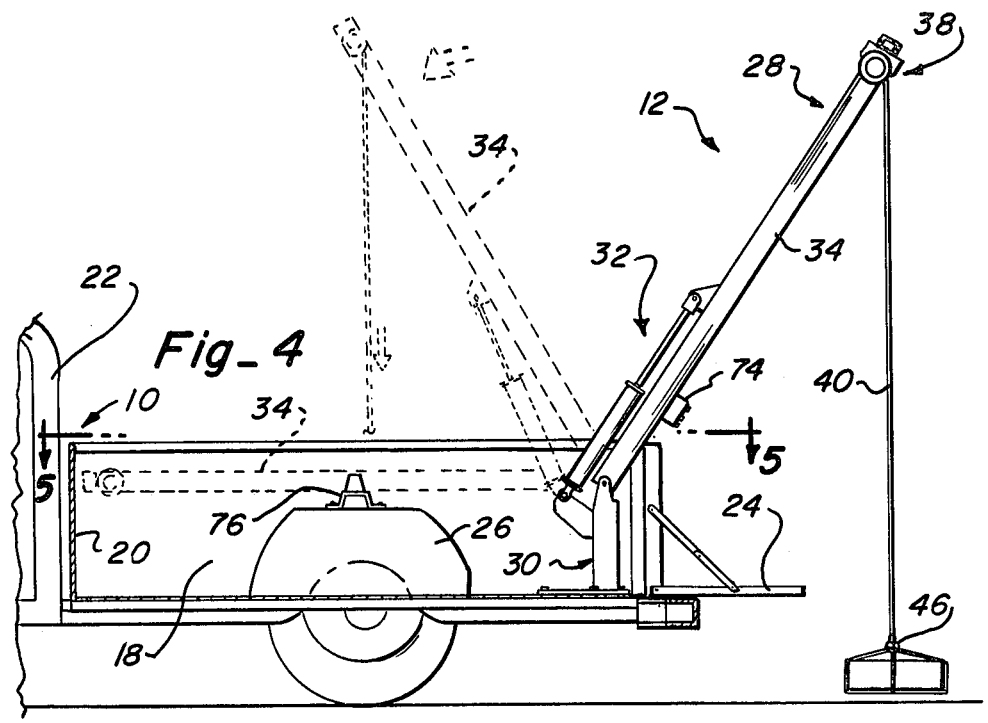
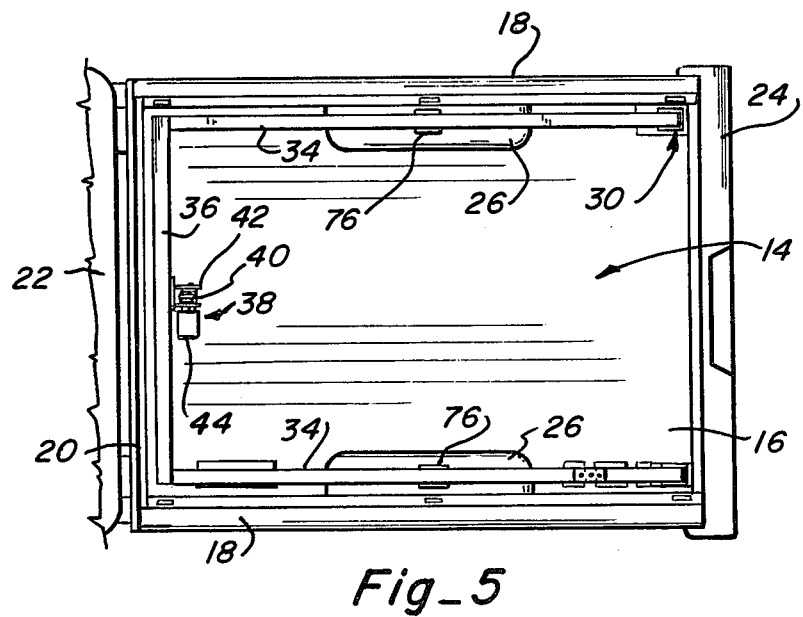

LIFT MECHANISM FOR PICKUP TRUCKS

BACKGROUND OF THE INVENTION

The present invention relates generally to lift mechanisms and, more specifically, to a lift mechanism adapted to be mounted on a cargo carrying vehicle to facilitate the movement of articles into and out of the vehicle.

The movement of heavy articles into and out of cargo carrying vehicles, such as pickup trucks and the like, has traditionally required several strong individuals who must exert a sufficient amount of energy to make the necessary transpositions of the article. Frequently, however, a sufficient number of people necessary to lift or transport an article are not available and, in these instances, a mechanical lift is very beneficial.

Lift mechanisms have been developed for use in connection with cargo carrying vehicles, such as pickup trucks and the like, and examples of such mechanisms are disclosed in U.S. Pat. No. 3,276,610, issued to C. R. Thatcher on Oct. 4, 1966, and U.S. Pat. No. 3,794,192, issued to Charles D. Monson on Feb. 26, 1974. Each of the mechanisms disclosed in these patents utilize a pivotal boom which is movable between a rest or non-use position along an exposed top side of the truck bed to an operative position wherein it overhangs the trailing end of the bed. However, the lift mechanisms disclosed in these patents are unnecessarily complicated and are exposed to view even when in a rest position.

OBJECTS AND SUMMARY OF THE INVENTION

It is a primary object of the present invention to provide a new and improved lift mechanism for cargo carrying vehicles which is of simplified and reliable construction.

It is another object of the present invention to provide a new and improved lift mechanism for cargo carrying vehicles wherein the mechanism can be confined within the bed area of the vehicle so as not to substantially alter the aesthetic appearance of the vehicle.

Pursuant to the objects of the invention, the present invention has been designed to be of simplified and reliable construction and so that the entire mechanism can be moved into a rest position which is completely within the confines of the bed of the vehicle so as not to alter the aesthetic appearance of the vehicle.

The lift mechanism of the present invention includes an inverted U-shaped boom which is pivotally mounted on a pair of stanchions connected to the bed of a cargo carrying vehicle near the trailing end of the vehicle. A pair of push-pull cylinders interconnect the boom with the support stanchions and are operative to move the boom between a rest position lying completely within the confines of the bed area of the vehicle and an operative position wherein the boom inclines outwardly and rearwardly so as to overhang the rear portion of the vehicle bed. A winch is mounted on the boom and has a cable lift system for attachment to articles which are to be moved into or out of the vehicle bed whereby cooperative movement of the boom and the winch can effect an easy transfer of an article into or out of the vehicle bed.

BRIEF DESCRIPTION OF THE DRAWINGS

FIG. 1 is a perspective view of a pickup truck having the lift mechanism of the present invention mounted thereon and disposed in an operative position.

FIG. 2 is a rear elevational view of the truck and lift mechanism as illustrated in FIG. 1.

FIG. 3 is an enlarged fragmentary section taken along line 3—3 of FIG. 2.

FIG. 4 is an enlarged fragmentary section taken along line 4—4 of FIG. 2.

FIG. 5 is a section taken along line 5—5 of FIG. 4 but with the lift mechanism being in a rest position rather than the operative position illustrated in FIG. 4.

DESCRIPTION OF THE PREFERRED EMBODIMENT

Referring first to FIG. 1, a pickup truck 10 is illustrated having the lift mechanism 12 of the present invention mounted thereon. The pickup truck is of a conventional type, having a bed area 14 defined by a flat cargo carrying bed 16, a pair of upstanding side walls 18 along opposite sides of the bed, a front wall 20 immediately behind the cab 22 of the truck, and a tailgate 24 along the trailing edge of the bed 16 which is movable between an open position, as illustrated, and a closed position, wherein it defines the fourth raised wall around the flat bed 16 of the truck. Wheel wells 26 for the rear wheels of the truck protrude into the bed area 14 of the truck immediately adjacent to the side walls 18 about midway along their length.

The lift mechanism 12 of the present invention can be seen to be mounted within the bed area 14 of the truck and, as will be appreciated with the description hereafter, when the lift mechanism is not in use, it can be completely confined within the bed area so that it is not readily visible unless one were to look downwardly into the bed area. The lift mechanism includes an inverted U-shaped boom 28 pivotally mounted on a pair of stanchions 30 secured to the bed 16 of the truck near the trailing end of the bed, a pair of power cylinders 32 interconnecting the boom and the stanchions, and power means for operating the power cylinders so that they can move the boom between a rest position lying completely within the confines of the bed area of the truck and an operative position wherein the boom extends upwardly and rearwardly so as to extend beyond the tailgate of the truck when the tailgate is in an open condition.

The area covered by the inverted U-shaped boom 28 is slightly smaller than the area defined by the bed 16 of the truck, with the boom including a pair of parallel side legs 34 and a connecting leg 36 bridging the space between associated ends of the side legs. The connecting leg 36 is secured to the ends of the side legs in any suitable manner, such as by welding. In the disclosed embodiment, each leg of the boom is formed from tubular metal stock of square transverse cross section. A conventional electrically operated winch 38 is connected to the connecting leg 36 of the boom at its midpoint. The winch has an elongated cable 40 and a drum 42 around which the cable can be wrapped as the drum is rotated by an electric motor 44 mounted adjacent to the drum. The lower end of the cable 40 carries a hook 46 or other type of releasable fastening means so that an article A which is to be loaded into or out of the bed of the truck can be gripped by the hook.

The support stanchions 30, in the preferred embodiment of the invention, have a main body portion 48, which is also made of tubular steel stock of square cross section, a base plate 50 welded to one end of the main body 48, and a pair of integral upstanding ears 52 projecting upwardly from the opposite end of the body from the base plate 50. The base plate has a plurality of openings (not seen) therethrough for receiving attachment bolts 54 which anchor the stanchions to the bed 16 of the truck immediately adjacent to the trailing end of the bed and on opposite sides closely adjacent to the side walls 18 of the truck. The upstanding ears 52 on each stanchion have openings therethrough through which a pivot pin 56 is secured to pivotally support the lower ends of the side legs 34 of the boom for pivotal movement through parallel vertical planes. Each stanchion 30 further has a plate-like bracket 58 extending forwardly in a vertical plane from the tubular body 48 of the stanchion. This bracket is welded or otherwise securely affixed to the tubular body and has a hole through an end portion thereof which is adapted to receive a pivot pin 60 for pivotally mounting one end of one of the power cylinders 32 in a manner to be described hereinafter.

The power cylinders 32 form a push-pull system for moving the boom 28 between the rest and operative positions and in the disclosed embodiment are illustrated as hydraulic cylinders having a fluid sealed body 62 and a push-pull rod 64 with conventional mechanism within the body for moving the rod 64 between extended and retracted positions upon the flow of hydraulic fluid in the body. As mentioned previously, the lower ends of the power cylinders 32 are pivotally connected to the forwardly extending brackets 58 on the stanchions 30 and the free ends of the push-pull rods 64 are similarly pivotally connected to a bracket 66 integrally connected to the associated side leg 34 of the boom at a preselected distance along the boom on the same side thereof as the power cylinder. As will be appreciated by reference to FIG. 3, the brackets 58 and 66 for mounting the power cylinders are designed and arranged so that, when the push-pull rods are fully extended and the boom is in its operative position, the cylinders 32 are oriented in parallel relationship with the associated side leg of the boom.

Again referring to FIG. 3, the hydraulic system for the power cylinders 32 is shown to include a reservoir 68 for the fluid, electrically operated pump means 70 for moving the fluid to and from the cylinders, and a motor 72 for operating the pump 70. The motor 72 is energized by the battery (not shown) of the truck 10. The battery also energizes the winch 38 through electrical wiring which passes through a switch box 74 also mounted on the boom.

It will be appreciated that the boom 28 is normally disposed in its rest position, best illustrated in FIGS. 4 and 5, with the side legs 34 of the boom being supported and retained by a pair of brackets 76 mounted upon the wheel wells 26 of the truck. These brackets 76 are disposed at an elevation such that the boom, in its rest position, is horizontally disposed at a level below the upper edges of the side walls 18 of the truck bed. In this manner, it will be appreciated that the lift mechanism 12 is not visible unless one were to look downwardly into the bed. Accordingly, the lift mechanism, in its rest position, does not detract from the aesthetic appearance of the vehicle.

To move the boom 28 from its horizontal rest position to the operative position illustrated in FIGS. 1 through 4, the hydraulic cylinders 32 are actuated to cause the push-pull rods 64 to be extended which, in turn, due to the leverage placed on the boom, causes the boom to swing through a clockwise arc, as viewed in FIG. 4, until the boom reaches its operative position, illustrated in full lines in FIG. 4. In this position, the connecting leg 36 of the boom has passed horizontally beyond the tailgate 24 of the vehicle so that the winch cable 40, when dropped, will hang beyond the tailgate and can be connected to the article A to be lifted onto the truck bed. After the hook 46 on the winch cable has been connected to the article, the winch is activated through the switch box 74 to raise the article above the truck bed level. After the article has been raised above the truck bed level, the power cylinders 32 are actuated to retract the push-pull rods, thereby causing the boom to pivot into a position wherein it it still inclined upwardly but overlies the truck bed, as illustrated in FIG. 4. Once in this position, the winch can be reversed to lower the article onto the truck bed, at which point the hook can be released from the article. The boom is then further lowered by retracting the push-pull rod until the boom lies in the horizontal rest position. Of course, the opposite procedure is utilized for removing the object from the truck bed.

It will be appreciated from the foregoing description that the lift mechanism is of very simple construction so that it is reliable in operation and can be easily installed in any load carrying vehicle. Also, due to the design of the mechanism, it is completely concealed within the truck bed when in a normal rest condition, thereby not detracting from the aesthetics of the truck.

Although the present invention has been described with a certain degree of particularity, it is understood that the present disclosure has been made by way of example, and changes in detail or structure may be made without departing from the spirit of the invention, especially as defined in the appended claims.

What is claimed is:

1. A lift mechanism for a cargo carrying vehicle having a flat bed, a pair of parallel side walls extending upwardly along opposite sides of said flat bed, and a front end wall interconnecting the side walls at the forward end of said flat bed, said side walls and end wall having upper edges defining an open top for the bed portion of the vehicle, said lift mechanism comprising:

an inverted U-shaped boom having a pair of substantially parallel side legs and a connecting leg, said connecting leg connecting the side legs at one end thereof, a pair of support means anchored to said vehicle, said pair of support means being disposed one on each side of said flat bed between said side walls, each of said support means including first connection means for pivotably supporting the other end of one of said side legs, said first connection means being at a lower level than the upper edges of said side walls of the vehicle, a pair of longitudinally extensible push-pull means, second connection means on each support means pivotably connecting one end of one of said push-pull means to an associated one of said support means, said second connection means being positioned forwardly of said first connection means and at a lower elevation than said first connection means, a pair of third connection means, one of said pair on each of said side legs pivotally connecting the other end of said push-pull means to an associated side leg, power means on said vehicle operatively connected to each of said push-pull means to selectively extend and retract the push-pull means, thereby moving the boom through an arc about an axis interconnecting said pair of first connecting means, said arc being such that the boom can be moved from a forwardly extending generally horizontal position to a rearwardly inclined position overhanging the rearwardmost extent of said bed, said lift mechanism when the boom is in the forwardly extending generally horizontal position being completely beneath the upper edges of the side and end walls, and a winch on said connecting leg including means for attachment to an article to be lifted into and out of said vehicle bed.

* * * * *